US008427716B2

(12) United States Patent
Huang (10) Patent No.: US 8,427,716 B2
(45) Date of Patent: *Apr. 23, 2013

(54) METHOD FOR AUTOMATICALLY IDENTIFYING SCAN AREA

(75) Inventor: Wen-Yung Huang, Miao-Li (TW)

(73) Assignee: Transpacific Systems, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,057

(22) Filed: Oct. 31, 2011

(65) Prior Publication Data

US 2012/0044545 A1 Feb. 23, 2012

Related U.S. Application Data

(63) Continuation of application No. 11/503,040, filed on Aug. 10, 2006, now Pat. No. 8,077,360, which is a continuation of application No. 10/020,973, filed on Dec. 19, 2001, now Pat. No. 7,212,316.

(51) Int. Cl.
*H04N 1/04* (2006.01)
*G03F 3/10* (2006.01)

(52) U.S. Cl.
USPC ........... 358/474; 358/453; 358/452; 358/486; 358/527

(58) Field of Classification Search .................. None
See application file for complete search history.

(56) References Cited

U.S. PATENT DOCUMENTS

| 5,880,858 | A | 3/1999 | Jin |
| 5,970,183 | A | 10/1999 | Amemiya et al. |
| 6,151,426 | A | 11/2000 | Lee et al. |
| 6,556,721 | B1 | 4/2003 | Wang et al. |
| 6,751,780 | B1 | 6/2004 | Neff et al. |
| 6,987,535 | B1 | 1/2006 | Matsugu et al. |
| 7,212,316 | B2 * | 5/2007 | Huang .......................... 358/474 |
| 8,077,360 | B2 * | 12/2011 | Huang .......................... 358/474 |
| 2004/0120009 | A1 | 6/2004 | White et al. |

FOREIGN PATENT DOCUMENTS

JP 4337964 11/1992

OTHER PUBLICATIONS

Stolowitz Ford Cowger LLP, "Listing of Related Cases", Dec. 12, 2011, 1 page.

* cited by examiner

*Primary Examiner* — Cheukfan Lee
(74) *Attorney, Agent, or Firm* — Stolowitz Ford Cowger LLP (57) ABSTRACT

In accordance with the present invention, a method for automatically identifying a scan area by a scanner is disclosed. The method comprises the steps of scanning an original comprising an object, identifying the original to establish a location and a profile of the object in the original, displaying a preview window corresponding to the original, wherein a location and a profile of a confined area is exactly the location and the profile of the object, receiving a framed area selected from the preview window by a user, wherein a portion of the framed area beyond the confined area is automatically removed to generate a scan area, and scanning the scan area. The present invention can also extend to a method for selecting a scan area by a user and a scanner with a feature of automatically identifying a scan area.

20 Claims, 8 Drawing Sheets

METHOD FOR AUTOMATICALLY IDENTIFYING SCAN AREA

CROSS-REFERENCE TO RELATED APPLICATIONS

This application is a continuation of U.S. patent application Ser. No. 11/503,040, filed Aug. 10, 2006, now U.S. Pat No. 8,077,360, issued Dec. 13, 2011,which is a continuation of U.S. patent application Ser. No. 10/020,973, filed Dec. 19, 2001, now U.S. Pat. No. 7,212,316, issued May 1, 2007.

BACKGROUND OF THE INVENTION

1. Field of the Invention

The present invention generally relates to a method for confining a framed area (or scan area) selected by a user in the scope of an object to be scanned, and more particularly to a method for identifying the scope of an object to be scanned by utilization of software.

2. Description of the Prior Art

Figure 1A:
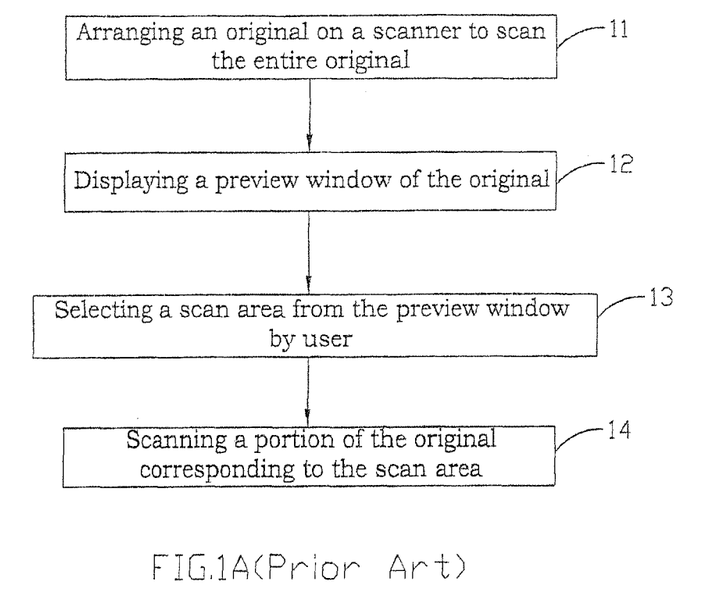
FIGS. 1A to 1F is an operating flow diagram of a scanner in the prior art, which illustrates schematic views of a desired framed area and an actual framed area.

The scanning procedure of a scanner in the prior art comprises the basic steps 11, 12, 13, and 14 illustrated in FIG. 1A. The conventional scanning method comprises the steps of arranging an original on a scanner to scan the entire original (step 11), displaying a preview window of the original (step 12), selecting a scan area from the preview window by a user (step 13), and scanning a portion of the original corresponding to the scan area (step 14). In general, the resolution (unit dpi) used in the scan of the selected scan area is higher than the resolution used in the scan of the entire original. The first scan is for providing a user the preview window to select the scan area. The second scan is usually for generating the desired result of the scanning procedure.

Figure 1B:
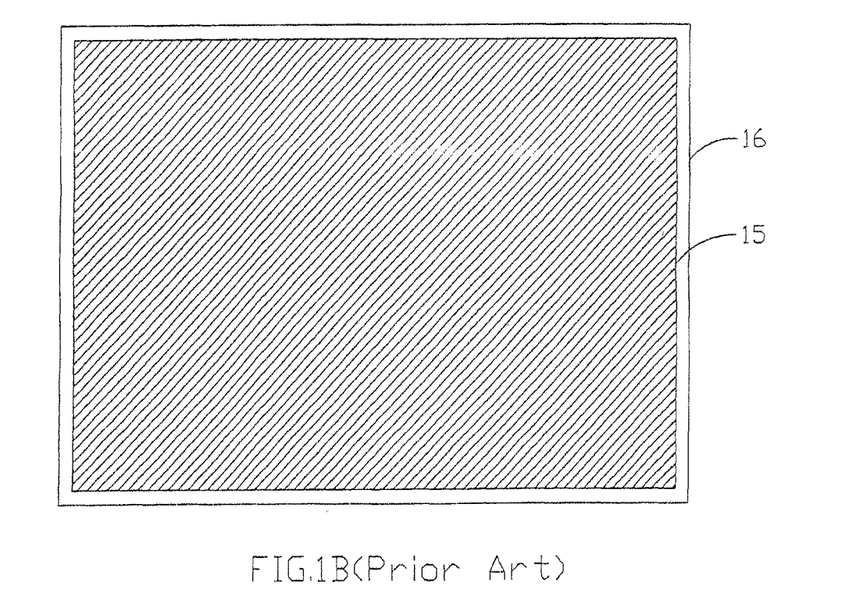
Figure 1C:
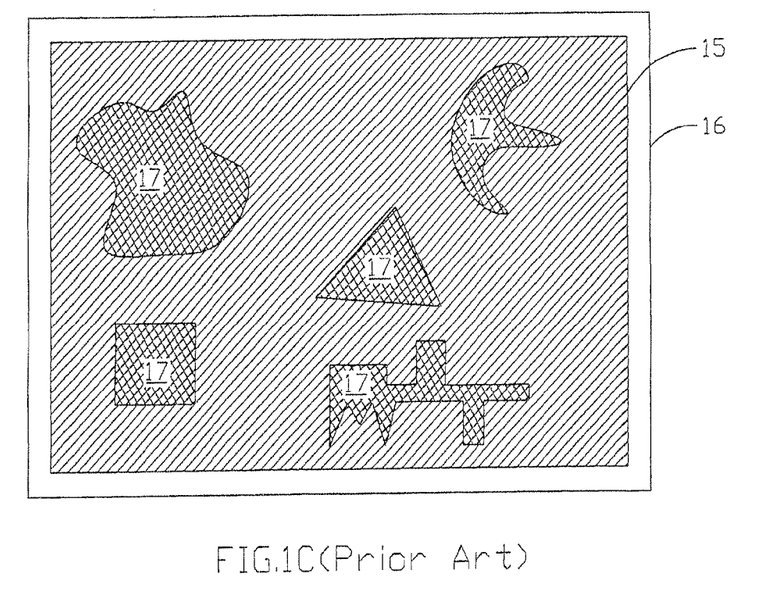
Figure 1D:
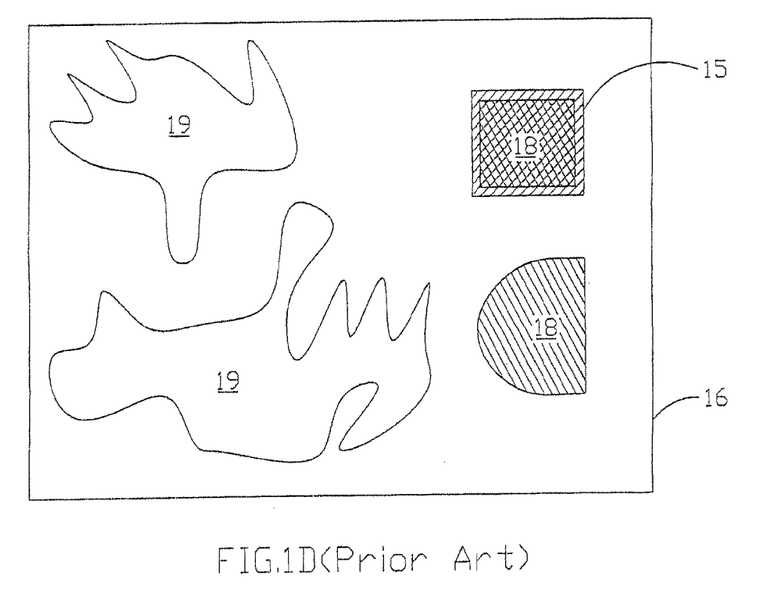

Apparently, when the scan area 15 of a user's desire is close to the entire original 16 (as shown in FIG. 1B), includes all objects 17 in the original 16 (as shown in FIG. 1C), or is a specific object with regular shape 18 in the original 16 (as framed regular object 18 on the upper right in FIG. 1D), four corners (upper right, lower right, upper left, and lower left) of the scope of an image to be processed can be easily and manually determined by the user. Thus, a rectangular scan area 15 is obtained. More particularly, after the scan area 15 is scanned, an image process is applied to the result of the scan, thus the criteria of the scan area is capable of covering all areas that a user wants to scan instead of exactly equal to all areas, as illustrated in FIGS. 1B to 1D.

Figure 1E:
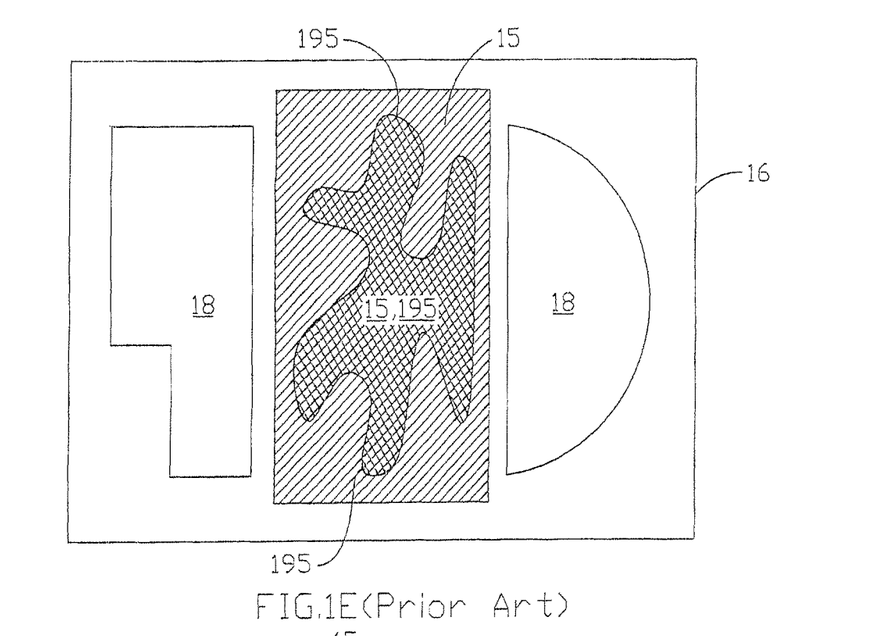
Figure 1F:
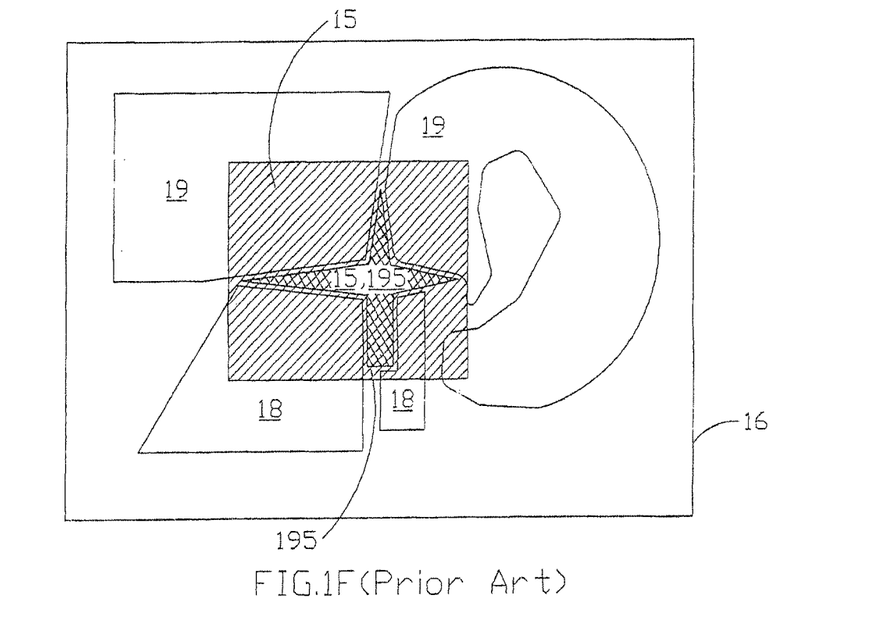

However, when the scan area of user's desire is a specific irregular object 195 in the original 16, especially when the specific object 195 is adjacent to a plurality of objects (regular object 18 or irregular object 19), only a scan area of rectangular shape 15 as shown in FIG. 1E is generated instead of a scan area of an exact shape of the object 195 due to the limitation of manually selecting four corners (upper right, lower right, upper left, and lower left) of the scan area in the prior art. Consequently, the scan area 15 includes irrelevant redundant areas in the periphery around the object, that is the user can't frame an exact scan area of the object 195 without including any unnecessary adjacent objects, as shown in FIG. 1F. Therefore, the user has to take an extra step of selecting the wanted image after an image process is performed. Furthermore, though an image process is performed after scanning the scan area 15, the user usually encounters the problem of manually precisely framing an irregular image of an irregular object in the duration of performing the image process.

In other words, the scope displayed on the preview window is corresponding to the entire original leading to the difficulties in accurately selecting a scan area by users in the conventional operating procedure of a scanner, especially when the user wants to scan an irregular pattern or a specific pattern adjacent to a plurality of patterns. Therefore, It is necessary to develop an operating procedure of a scanner that is to promote the efficiency of use and create user-friendly interface.

SUMMARY OF THE INVENTION

In accordance with the present invention, a method for readily selecting a scan area in the scope of an object to be scanned by user that promotes a user-friendly interface is provided.

It is another object of this invention that a method for accurately selecting a scan area of an object without adding any extra manual process is provided.

In accordance with the present invention, a method for automatically identifying a scan area by a scanner is disclosed. The method comprises steps of scanning an original comprising an object, identifying the original to establish a location and a profile of the object in the original, displaying a preview window corresponding to the original, wherein a location and a profile of a confined area in the preview window is exactly the location and the profile of the object, receiving a framed area selected from the preview window by user, wherein a portion of the framed area beyond the confined area is automatically removed to generate a scan area, and scanning the scan area.

In accordance with the present invention, in another embodiment, a method for selecting a scan area by a user is provided. The method comprises steps of scanning an original comprising an object, obtaining a preview window, wherein a location and a profile of a confined area in the preview window is exactly a location and a profile of the object, selecting a framed area from the preview window, wherein a portion of the framed area beyond the confined area is automatically removed to transform the framed area into the scan area, and scanning the scan area.

In accordance with the present invention, in a further embodiment, a scanner with a feature of automatically identifying a scan area is provided. The scanner comprises a scanning flatbed, a scanning module, a logic operation module, a display module, and an evaluating module. The scanning flatbed is for supporting an original. The scanning module is for scanning the original to generate information. The logic operation module is for calculating a location and a profile of an object in the original by use of an algorithm responsive to the information, wherein the algorithm can be updated and modified by external process. The display module is for displaying a preview window corresponding to the original, wherein a confined area with a location and a profile of in the preview window comprises the location and the profile of each object. The evaluating module is for receiving a framed area selected from the preview window by the user, wherein a portion of the framed area beyond the confined area is automatically removed to generate a scan area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

From the close interpretation of FIG. 1A to FIG. 1F, it is clear to know that not only the preview window displays an image of the entire original, but also images of every objects are not separately presented, and therefore the user can select only a rough scope of image including a desired object but not a precisely wanted image of the object to be processed.

The present invention is directed toward a method for answering the drawback in the prior art. One key aspect of the present invention is the object presented in the preview window is bounded in a confined area with same location and profile, or only images of objects displayed such that a scan area selected by user is confined in the confined area or in the image of the object. Thus, users can readily select a wanted scan area because the area beyond the confined area or the image of object won't be treated as a portion of the scan area. That is a framed area including a scan area and the periphery of the scan area is selected, then a portion of the framed area beyond the confined area or the image of object is removed.

It is noted that massive information is usually obtained in the step of scanning an original to form a preview window. Thus, another key aspect of the present invention is the information is calculated by use of an algorithm (performed by use of a scanner, a computer, a ASIC, or any suitable tools) to obtain the location and the profile of every object prior to displaying the preview window, such that a confined data related to the confined area and the image of object is also obtained. Moreover, because the user also inputs an input data to a scanner or a computer in the step of selecting a framed area, a scan area that is what the user really wants to scan is readily obtained by comparing the input data and the confined data.

Figure 2A:
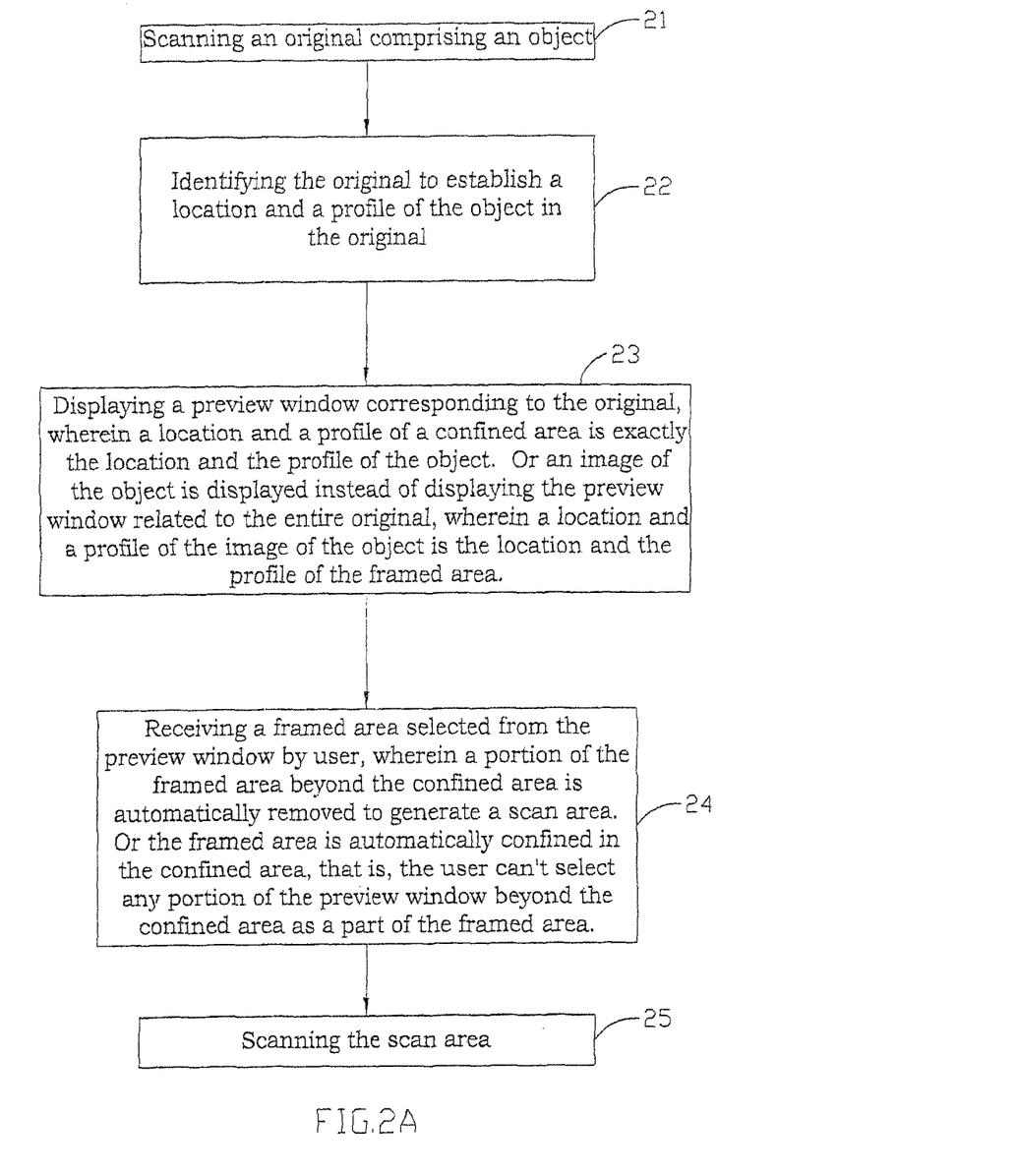
FIGS. 2A to 2E is a flow diagram of an operating procedure and illustrates a schematic view of the relationship between a framed area and a desired scan area in one embodiment.

According to the above description, in one embodiment, a method for automatically identifying a scan area by a scanner is provided. Referring to FIG. 2A, the method in accordance with the present invention comprises steps 21, 22, 23, 24, and 25.

As illustrated in first scanning block 21, an original comprising an object is scanned.

As illustrated in identifying block 22, the original is identified to establish a location and a profile of the object in the original, wherein the location and the profile of the object is judged by ways of calculating information obtained in the scanning step by use of an algorithm. The algorithm is performed by use of a scanner, a computer, or any other suitable tools and not critical to the application of the present invention. The suitable algorithm can be a gray scale calculation, steps of transforming the information into a plurality of pixels and determining the location and the profile of the object by comparing the differences between each pixel, or calculating information gradually from edges to center of the original to determine the location and the profile of the object. The present invention can be incorporated with any algorithm of the present technology, which can be applied to determine the profile or the location of the object. The detail about the algorithm is not critical to the application of the present invention. Additionally, if there are a plurality of algorithm available, the present invention can be extended to further comprise steps of receiving a selection message inputted by user and performing the calculation by use of a specific algorithm responsive to the selection message.

As illustrated in display block 23, a preview window is displayed, wherein a location and a profile of a confined area in the preview window is exactly same as the location and the profile of the object. The method further comprises step of displaying an image of the object instead of displaying the preview window related to the entire original, wherein a location and a profile of the image of the object is the location and the profile of the framed area. Besides, when there is a plurality of isolated objects in the original, there can be a plurality of confined areas in the preview window, wherein any profile of the confined areas is one of the profiles of the objects, and any object corresponds to one of the confined areas. Naturally, when there is a plurality of isolated objects in the original, there can be only one confined area in the preview window, wherein the profile of the confined areas comprises every profile of the objects to confine every object in the confined area.

As illustrated in receiving block 24, a framed area having the confined area selected from the preview window by a user is received, wherein the framed area is transformed into a scan area by ways of automatically removing a portion of the framed area beyond the confined area. Moreover, the method further comprises a step of automatically confining the framed area in the confined area, that is the user can't select any portion of the preview window beyond the confined area as a part of the framed area.

As illustrated in second scanning block 25, the scan area is scanned. Moreover, at least one parameter inputted by the user can be received, then, the scan area is scanned responsive to the parameters.

Figure 2B:
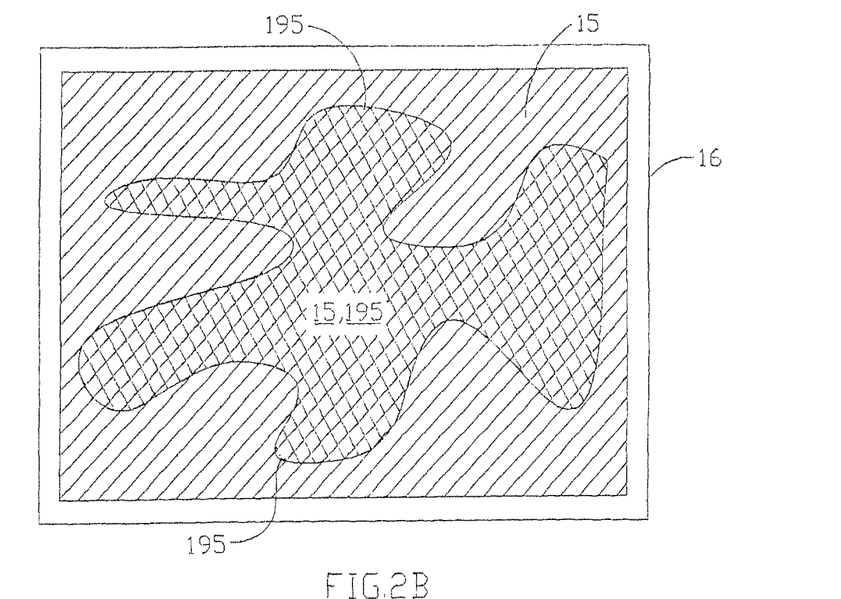
Figure 2C:
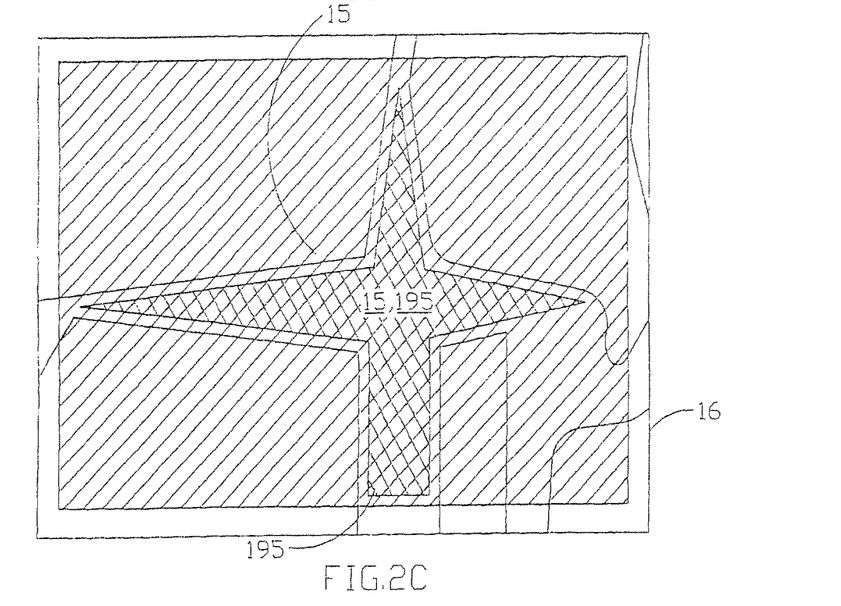
Figure 2D:
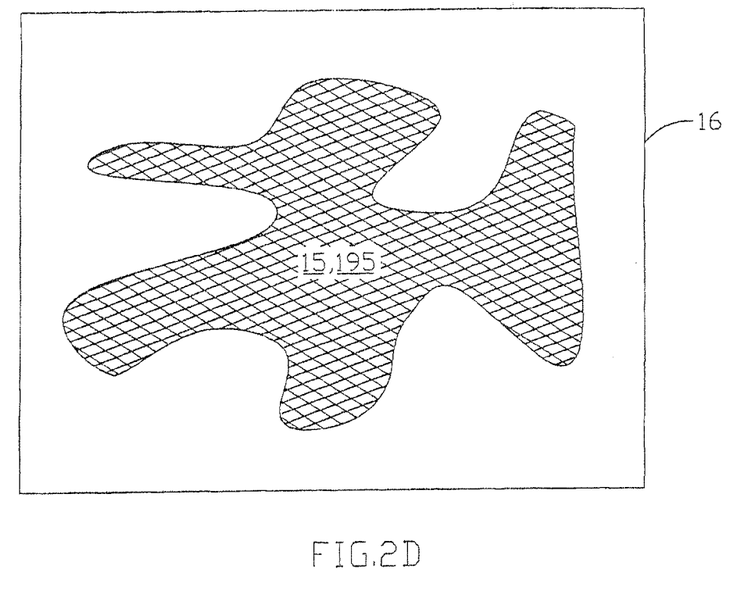
Figure 2E:
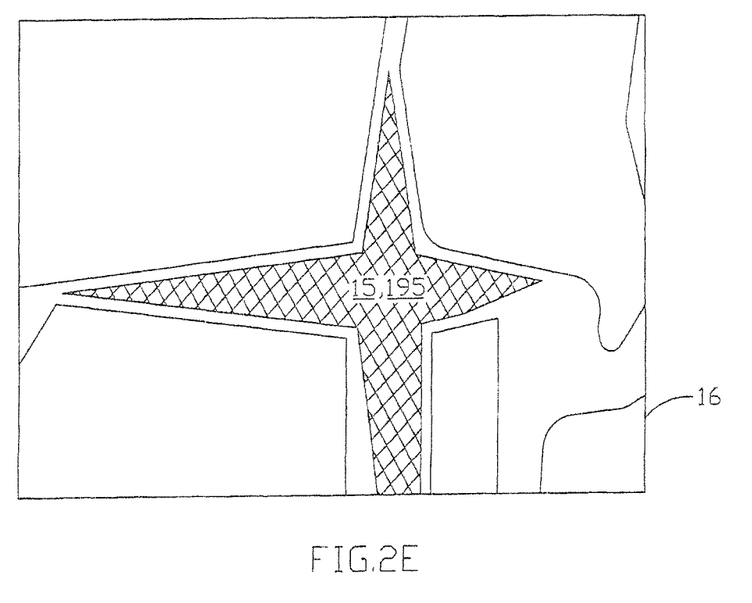

The influence of the present invention is illustrated in FIGS. 2B to 2E, which can be compared with the prior art depicted in FIGS. 1E to 1F. Apparently, due to the unavoidable consequence occurred in the selection of a desired image, only a rectangular scan area including the image is selected by a user. Though FIGS. 2B and 2C show the same impression as in FIGS. 1E and 1F, FIGS. 2D and 2E indicate one key aspect of the present invention. Owing to a portion of the framed area beyond the specific object 195 is removed, if the profile of the scan area 15 is not the same as the profile of the specific object 195, then the user must intend to not scan the entire specific object 195 but an area within the specific object 195. Therefore, the shortcoming usually happened in the prior art is significantly improved. It is noted that, as shown in FIGS. 2C and 2E, in the case of handling a specific object (or image, or confined area), which is adjacent to a plurality of objects (or images, or confined areas), the present invention can further define that only the object (or image, or confined area) which is entirely within the framed area is preserved, and other objects are removed from the framed area if only parts of the objects are within the framed area. Thus, the present invention provides a feature for a user to easily select a framed area including the desired object to achieve the goal of later performing a process only on the desired object, in the mean time, prevents the shortcoming of the prior art including adjacent objects in the process.

Figure 3:
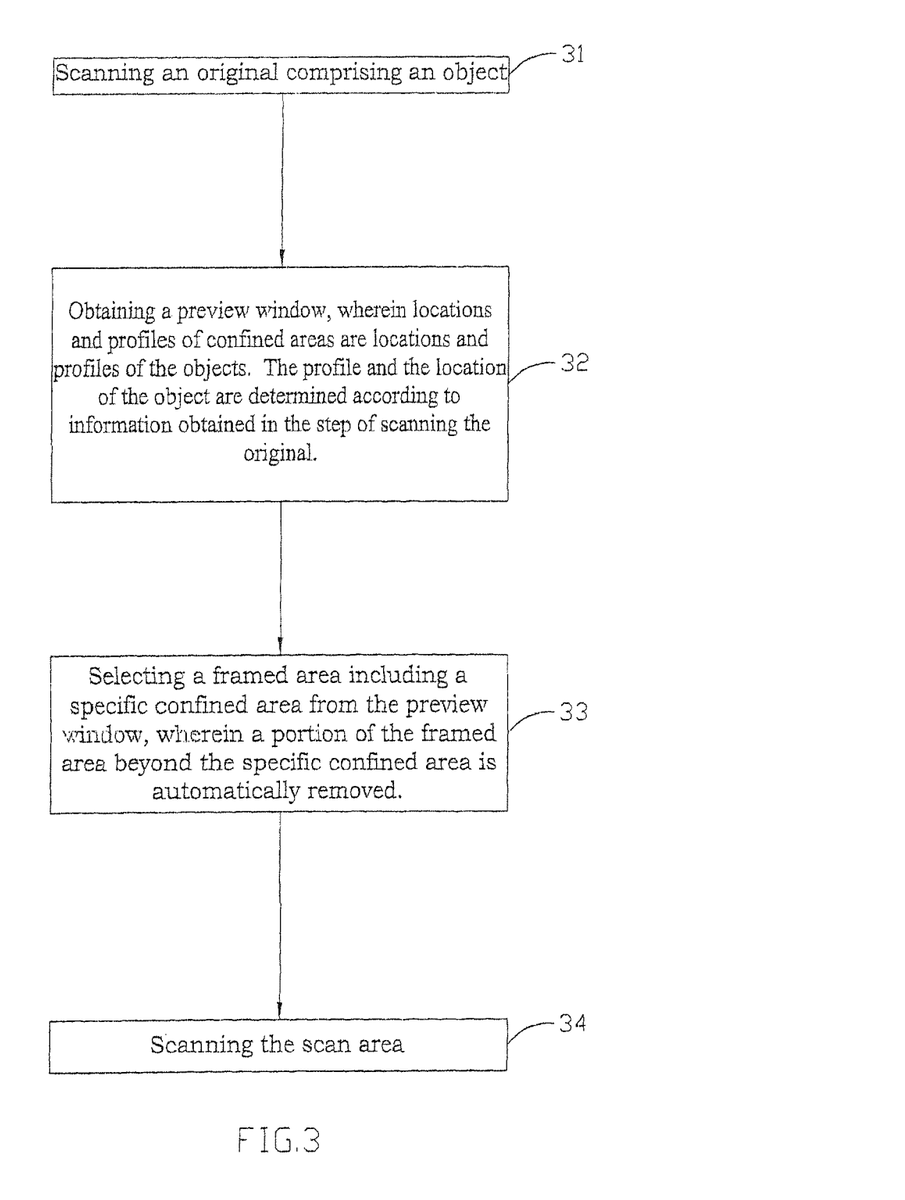
FIG. 3 is an operating procedure in another embodiment.

In accordance with the present invention, in another embodiment, a method for selecting a scan area by a user is provided. Referring to FIG. 3, the method in accordance with the present invention comprises steps 31, 32, 33, and 34.

As illustrated in first scanning block 31, an original comprising an object is scanned.

As illustrated in preview window block 32, a preview window is obtained, wherein locations and profiles of confined areas are exactly locations and profiles of the objects. The confined areas correspond the objects one-to-one. Information obtained in the scan of the original is calculated by use of an algorithm to get the location and the profile of the object. The calculation is performed by use of a computer, a scanner, or any other tools, not manually calculated by the user. Additionally, when there is a plurality of algorithm available, the user inputs a selection message to determine what algorithm is adopted, then the location and the profile of the object is calculated by use of the selected algorithm.

As illustrated in manually selecting block 33, a framed area including at least one of the confined areas is selected from the preview window, wherein a portion of the framed area beyond the confined area is automatically removed, such that the framed area is transformed into a scan area. In some cases, the framed area is automatically confined in the confined area, and the user can't select any portion of the preview window beyond the confined area as a part of the framed area. Additionally, when there is a plurality of isolated objects in the original, there can be a plurality of confined areas in the preview window, wherein any profile of the confined areas is one of the profiles of the objects, and any object corresponds to one of the confined areas. Naturally, when there is a plurality of isolated objects in the original, there can be only one confined area in the preview window, wherein the profile of the confined areas comprises every profile of the objects to confine every object in the confined area.

As illustrated in second scanning block 34, the scan area is scanned. Furthermore, at least one parameter inputted by the user can be received, then, the scan area is scanned responsive to the parameters.

Figure 4:
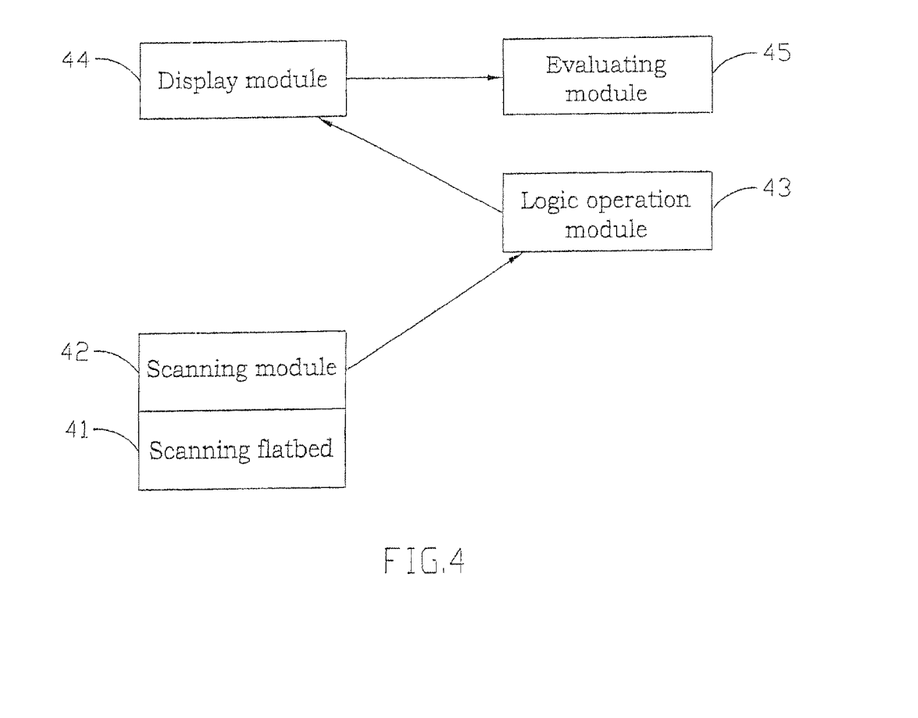
FIG. 4 is a schematic structure in a further embodiment.

In accordance with the present invention, in a further embodiment, a scanner with a feature of automatically identifying a scan area is provided. Referring to FIG. 4, the scanner comprises a scanning flatbed 41, a scanning module 42, a logic operation module 43, a display module 44, and an evaluating module 45.

The scanning flatbed 41 is for supporting an original. The scanning module 42 is for scanning the original to generate information.

The logic operation module 43 is for calculating a location and a profile of an object in the original by use of an algorithm responsive to the information, wherein the algorithm can be updated and modified by external process.

The display module 44 is for displaying a preview window corresponding to the original, wherein a confined area with a location and a profile in the preview window comprises the location and the profile of each object.

The evaluating module 45 is for receiving a framed area selected from the preview window by the user, wherein a portion of the framed area beyond the confined area is automatically removed to generate the scan area.

In view of embodiments described above, in accordance with the present invention, users can readily select an object wished to be scanned, and the step of precisely controlling selection tools such as mouse to select accurate pattern in the image process is eliminated, thus a user-friendly interface between the user and the scanner is provided. Moreover, because the present invention identifies a scope of an object to be scanned by utilization of software, there is no need to change the structure of a scanner, and only the modification of software for operating the scanner can achieve the goal to not only reduce the cost but also promote the flexibility of upgrading the ability of identification. Especially from a user's view, no extra process has to be done to get an accurate scan area of the desired object.

Although specific embodiments have been illustrated and described, it will be obvious to those skilled in the art that various modifications may be made without departing from what is intended to be limited solely by the appended claims.

The invention claimed is:

1. An apparatus, comprising:
  circuitry configured to scan an original comprising a plurality of objects including a first object and a second object;
  circuitry configured to generate a preview window of the scanned original, wherein the preview window includes a profile for the first object, and wherein the profile defines an enclosed area of the preview window;
  circuitry configured to remove the second object that is at least partially located outside of the enclosed area in defining a scan area that includes the enclosed area; and
  circuitry configured to scan the scan area.

2. The apparatus of claim 1, further comprising circuitry configured to determine the profile that corresponds to a location of the first object based, at least in part, on information obtained from scanning the original.

3. The apparatus of claim 2, wherein the information comprises object edge data.

4. The apparatus of claim 1, wherein the first object is located entirely within the enclosed area, and wherein the second object is partially located within the enclosed area.

5. The apparatus of claim 1, further comprising circuitry configured to remove portions of the preview window that are outside the enclosed area.

6. The apparatus of claim 1, further comprising circuitry configured to generate a single profile for the plurality of objects.

7. The apparatus of claim 1, further comprising circuitry configured to determine a single enclosed area that includes a plurality of profiles.

8. An apparatus, comprising:
  circuitry configured to generate a preview of a scanned original, wherein the scanned original comprises one or more objects, and wherein the preview comprises a profile for the one or more objects;
  circuitry configured to determine a scan area based, at least in part, on a confined area associated with the one or more objects and on a removal of portions of the preview window that are beyond the confined area, wherein the profile of the one or more objects defines the confined area; and
  circuitry configured to scan the scan area after the portions are removed.

9. The apparatus of claim 8, further comprising circuitry configured to remove an object that is both partially located within the scan area and partially located outside of the scan area.

10. The apparatus of claim 8, wherein the preview comprises a plurality of profiles associated with a plurality of objects, and wherein the confined area is defined by one or more of the plurality of profiles.

11. The apparatus of claim 8, wherein the profile corresponds with a location of the one or more objects.

12. The apparatus of claim 8, further comprising circuitry configured to generate a single profile for a plurality of objects.

13. The apparatus of claim 8, further comprising circuitry configured to generate a separate profile for each of the one or more objects.

14. An apparatus, comprising:
   circuitry configured to generate a preview window of a scanned original comprising one or more objects, wherein the preview window includes a profile of the one or more objects, and wherein the profile defines a confined area of the preview window and corresponds to a location of the one or more objects of the scanned original;
   circuitry configured to identify portions of the preview window that are located outside of the confined area;
   circuitry configured to define a scan area to include the profile with the portions removed; and
   circuitry configured to scan the scan area.

15. The apparatus of claim 14, further comprising circuitry configured to determine the profile and the location based, at least in part, on information obtained from the scanned original.

16. The apparatus of claim 15, wherein the information comprises pixel data.

17. The apparatus of claim 15, wherein the information comprises object edge data.

18. The apparatus of claim 14, further comprising circuitry configured to remove an object that is both partially located within the scan area and partially located outside of the scan area before the scan area is scanned.

19. The apparatus of claim 14, further comprising circuitry configured to identify a plurality of profiles associated with two or more objects.

20. The apparatus of claim 19, further comprising circuitry configured to determine a single confined area comprising the plurality of profiles.

* * * * *

UNITED STATES PATENT AND TRADEMARK OFFICE
CERTIFICATE OF CORRECTION

PATENT NO. : 8,427,716 B2  
APPLICATION NO. : 13/286057  
DATED : April 23, 2013  
INVENTOR(S) : Huang Page 1 of 1

It is certified that error appears in the above-identified patent and that said Letters Patent is hereby corrected as shown below:

On the Title Page, item (58), under "Field of Classification Search", in Column 1, Line 1, delete "None" and insert -- 358/474, 486, 453, 527, 452, 488; 382/282, 291, 312, 318, 319; 250/234, 235 --, therefor.

In the Specifications:

In Column 2, Line 4, delete "Therefore, It" and insert -- Therefore, it --, therefor.

In Column 3, Line 8, delete "DESCRIPTION" and insert -- DETAILED DESCRIPTION --, therefor.

In Column 3, Line 11, delete "the invention" and insert -- the present invention --, therefor.

In Column 4, Line 5, delete "are a" and insert -- is a --, therefor.

Signed and Sealed this  
Twenty-third Day of July, 2013

Teresa Stanek Rea  
*Acting Director of the United States Patent and Trademark Office*